United States Patent Office

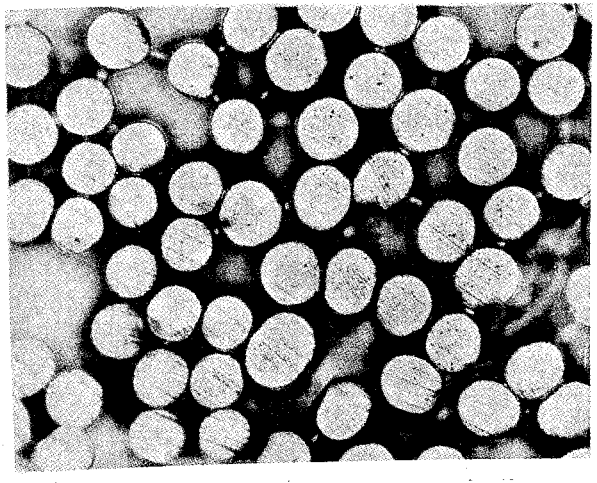
Fig-1-
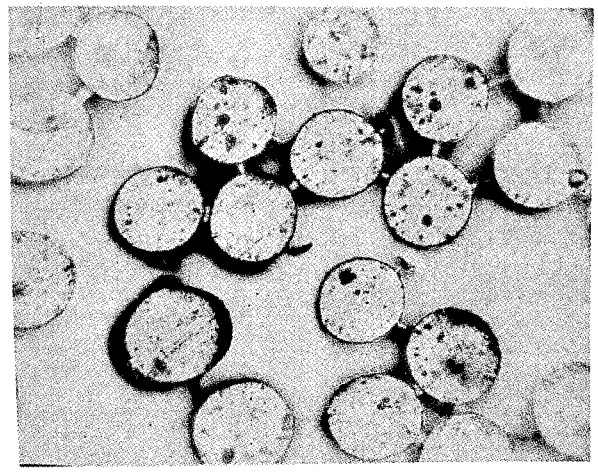
Fig-2-

Fig-5-

2,730,447
Patented Jan. 10, 1956

2,730,447

METHOD OF MANUFACTURING A HIGH PROTEIN FOOD PRODUCT AND THE RESULTING PRODUCT

Robert A. Boyer, Cincinnati, Ohio, assignor to Swift & Company, Chicago, Ill., a corporation of Illinois Application February 2, 1953, Serial No. 334,649

10 Claims. (Cl. 99—14)

The present invention relates in general to the preparation of new food products and more particularly to methods of treating edible protein material preparatory to forming the same into fibers or filaments for incorporation into food products. This invention represents an improvement over the method disclosed and claimed in my earlier filed application, Serial No. 118,445, entitled "Synthetic Meat," filed September 28, 1949, and now abandoned, and in the continuation-in-part thereof, Serial No. 286,447, filed May 6, 1952, now Patent No. 2,682,466.

Many efforts have heretofore been made to develop a satisfactory meat substitute which would possess the required amount of protein and which would simulate meat as to the texture, flavor, and appearance thereof. As disclosed in my aforementioned earlier filed application, a completely satisfactory meat substitute may be prepared from edible protein material, such as soybeans, corn or peanut proteins, as well as from animal proteins, such as casein. These protein materials are produced in the form of fibers or filaments which are coagulated in a suitable bath and oriented by suitable means, such as a series of rolls revolving at increasing speeds. The filaments are then placed in a salt solution (such as sodium chloride) of sufficient concentration to prevent the filaments from redissolving. Groups of these filaments, in accordance with the method disclosed in said earlier filed application, are then freed from excess liquid by squeezing or centrifuging and then mixed with a suitable edible binder. The individual groups of filaments may then be assembled into a tow and passed through a bath of melted fat or the like, or alternatively the individual groups of filaments may be first treated with fat and thereafter assembled into a tow. Different characteristics may be imparted to the final product by varying the steps leading up to the end product. For example, varying the pressure in assembling the final tow will vary the density and texture of the final product. Likewise, varying the method of coating the protein filaments will produce different effects. The toughness or tenderness of the resulting product can be controlled by the amount of stretch which is imparted to the filament in the initial forming procedure. This stretching results in an orientation of the molecules in the protein fibers and, as a general rule, will run from about 50 per cent to about 400 per cent stretch. The actual formation of the synthetic meat product is not considered to be a part of the present invention and has been described supra solely as an aid in understanding the problems met by the present invention.

In the production of synthetic meat as discussed above or in the production of other food products in a similar manner, it is essential to incorporate flavoring material and various other modifying agents into the protein material in order to simulate the color, flavor, and other characteristics of the meat or other food product being synthesized. As illustrated in my earlier filed application, it is possible to impart flavoring to the finished product by utilizing the appropriate fat for coating the protein filaments. However, it has been found that the individual fibers when coated in the manner aforesaid do not themselves possess the desired flavor. Likewise, the problem of uniform distribution of the various modifying agents throughout the protein material could not be satisfactorily solved by any known procedure.

It is therefore an object of the present invention to provide a method for introducing and incorporating modifiers into protein fibers or filaments It is an additional object of this invention to provide a method for the extrusion of protein fibers containing uniform quantities of modifying agents.

Additional objects, if not specifically set forth herein, will be readily apparent to one skilled in the art from the following detailed description of the invention.

In the drawings:

Fig. 1 is a photomicrograph of a cross section of edible protein fibers in which no additive or modifier has been incorporated.

Fig. 2 is a photomicrograph of a cross section of the same protein fibers containing 5 per cent of a modifier introduced in accordance with the present invention.

Fig. 5 is a photomicrograph of a cross section of the same protein fibers containing 32 per cent of a modifier introduced in accordance with the present invention.

Figure 3:
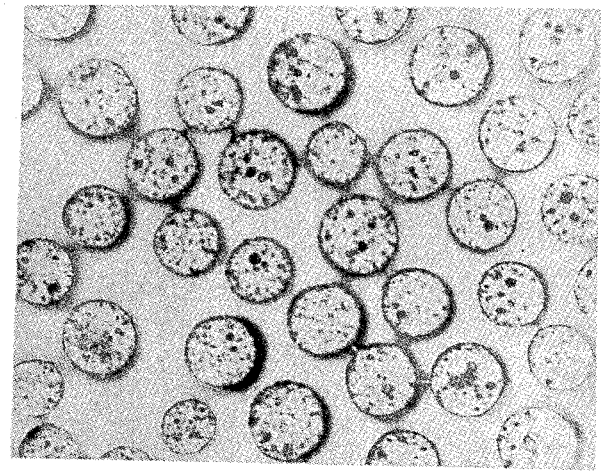
Fig. 3 is a photomicrograph of a cross section of the same protein fibers containing 10 per cent of a modifier introduced in accordance with the present invention.

In general the present invention contemplates the introduction and incorporation into edible protein fibers of certain miscible and/or nonmiscible materials. These materials may be incorporated for several reasons and to effect varying results. One of the primary purposes for the incorporation of such materials is to obtain uniform distribution of flavor throughout the protein filaments. Other additives or modifiers may be added by the method of the present invention to produce different results. For example, it is possible to increase the vitamin content of the end product by uniformly distributing a suitable modifier throughout the protein filaments, e. g., cod-liver oil. Additionally it is possible to increase the nutritive value and to vary the "chewiness" of the fiber by uniformly incorporating therein a suitable shortening material, such as a hydrogenated animal and vegetable oil shortening or the like. Further, it is possible to add dyes in accordance with the present invention to uniformly color the protein fibers.

More specifically the present invention contemplates the introduction of these modifiers or additives into edible man-made protein fibers either before the protein fibers are formed or during the actual formation thereof.

As illustrated in my earlier filed application, the protein fibers or filaments are preferably produced by dispersing the proteins which are the starting material in a suitable dispersing medium, such as an alkaline aqueous solution. Actually, depending upon the material dispersed and the dispersing agent used, the dispersion may amount to a colloidal solution, and it will be understood that the use of either term in the claims is inclusive of the other. This dispersion is then forced through a porous membrane, such as a spinneret used in the production of rayon, into a coagulating bath which is generally an acid salt solution. The streamlets coming through the spinneret are thus precipitated into the form of filaments. Alternatively, coarser filaments may be produced by starting with the proteins in the form of powdered material, plasticizing them with about 25 per cent alkaline water or other suitable plasticizing material, and then extruding the plasticized protein material through dies. The filaments produced by this mechanical extrusion process will be of much greater thickness than those produced by a rayon spinneret. These coarser filaments will be of a thickness on the order of paint brush bristles and, even though afterwards stretched, the final filament will be relatively coarse. On the other hand, the filaments issuing from a spinneret, which actually is a small die having from perhaps 5,000 to 15,000 holes each on the order of 0.003 inch in diameter, will be of a diameter of about 0.003 inch. When these latter filaments are stretched they are elongated and reduced in diameter until the average thickness is on the order of 20 to 40 microns.

According to the method of the present invention the modifiers or additives may be added, and preferably are added, to the protein material in dispersion. It has been discovered that by so doing a uniform distribution of the modifier or additive in the resulting filament is obtained. It is essential when following this procedure that the additive or modifier be thoroughly mixed into the protein dispersion preliminary to forcing the same through the spinneret.

An alternative method of incorporating the desired additives into spinneret filaments may be used in the case of aromatic materials, such as the spice oils or other additives desired to be present in the protein fibers in but trace amounts. This methods comprises adding the modifying agents to the precipitating bath wherein they are picked up by the filaments as they are precipitated.

If the protein filaments are to be formed from plasticized powdered material as discussed above, the addition of additive or modifying agent is made either during or immediately after the plasticizing step and before the material is extruded through the dies.

Examples of suitable additives or modifying agents which may be incorporated into the edible protein fibers in accordance with the present invention are cod-liver oil, salad oil, spice oils, skim milk solids, sugar, starch, hydrogenated vegetable or animal oil shortening, lard, cottonseed oil, butter, mono-sodium glutamate, protein hydrolysates, spices, gums, binders, flavoring agents, pigments, and dyes. This list of additives contains materials, some of which are miscible with the protein dispersion and others of which are nonmiscible therewith. In general the miscible or water-soluble materials may not be as satisfactorily incorporated in the protein fibers by the method of the present invention as can the nonmiscible materials. A certain amount of leaching out of these water-soluble materials takes place during the precipitation, stretching, and washing of the filaments. However, it is possible to retain in many instances, particularly when only a trace amount is desired, suitable quantities of these miscible materials in the protein fibers. Some water-soluble or miscible additives will react with the proteins and thus would be completely retained in the fibers. Typical examples of these are the water-soluble food dyes. In general it has been found that any material can be inporated uniformly within a protein fiber by the method of the present invention if such material can be dispersed in protein solution in particle sizes not exceeding the size of the orifice through which the protein is to be extruded. The additive must, of course, be edible in order to be satisfactory for the present method. One other criterion for additives used in the present invention is that they do not materially affect the solubility of the protein nor the homogeneity of the protein dissolved in solution, i. e., do not cause precipitation in the solution or do not seriously affect the viscosity of the solution.

The following specific examples are illustrative of the incorporation of additives in typical protein materials, but are not to be considered as providing any limitations on the scope of the instant invention.

*Example I*

A spinning solution was prepared consisting of 2,400 grams of casein, 48 grams of sodium hydroxide, and 7,600 cc. of water. The solution was filtered and deaerated in the usual manner known to the art. At this point 240 grams (10 per cent based on the weight of protein) of melted hydrogenated vegetable and animal oil shortening were added to the solution and mixed in slowly, stirring until all of the fat was thoroughly emulsified and no fat globules were visible on the surface. This mixture was then spun into fibers in the usual manner by extrusion through spinnerets into an acid bath. The resulting filaments were stretched and washed, and an examination of the fibers under the microscope revealed the fat to be entrapped internally of the fibers in the form of minute globules. Chemical analysis indicated that the majority of the fat was thus retained in the fibers.

*Example II*

A spinning solution of 3,620 grams of casein, 725 grams of 10 per cent sodium hydroxide, and 13,780 cc. of water was heated to 160° F., deaerated, and filtered. Three 4,000 cc. samples were then collected and to each sample 4 cc. of a spice oil were added (0.5 per cent spice based on the weight of the dry protein). The spice oils used were oil of nutmeg, oil of clove, and oil of cassia. After thorough mixing the samples were spun into fibers and treated as in Example I. The resulting fibers retained a strong uniform spice flavor.

*Example III*

Five thousand four hundred forty grams of casein, 1,089 grams of 10 per cent sodium hydroxide, and 20,700 cc. of water were heated together to 160° F. To this solution were then added 24 cc. of a 1 per cent solution of red dye, 24 cc. of a 1 per cent solution of brown dye, 30 cc. of liquid smoke, and 775 grams of salad oil. The additives were uniformly mixed in the solution and then fibers were prepared as in Example I. The resulting fibers had a uniform reddish-brown color, possessed a distinctive smoke odor, and were found to have globules of fat distributed throughout.

Figure 4:
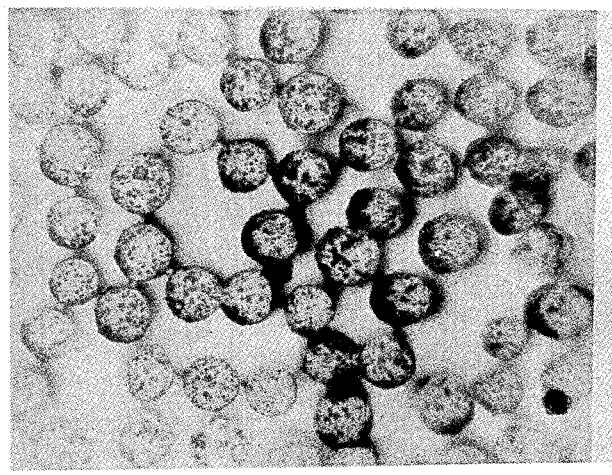
Fig. 4 is a photomicrograph of a cross section of the same protein fibers containing 15 per cent of a modifier introduced in accordance with the present invention.

Referring now to the drawings, Figs. 1–5 are photomicrographs illustrating the uniform distribution throughout protein fibers of varying amounts of an additive incorporated by the method of the present invention. In each instance the additive used was a shortening comprising a mixture of hydrogenated vegetable oil and lard. The protein material used in each instance was casein, and the incorporation was carried out in the manner illustrated in the preceding examples. Referring to Fig. 1, it will be noted that the individual fibers, shown in cross section, contain relatively no extraneous material. Using this as a basis for comparison, the uniform distribution of additive in the protein fibers will be observed in Figs. 2 through 5 wherein the amounts of additive were gradually increased. Fig. 2 illustrates fibers produced by the present invention containing 5 per cent of the additive. Fig. 3 shows the result of a 10 per cent addition of additive. Fig. 4 illustrates 15 per cent additive, while Fig. 5 shows protein fibers containing 32 per cent of the additive. As the level of additive is increased, it will be noted that the amount of additive contained in each individual fiber increases quite uniformly. This is important since the fibers are designed for incorporation in a synthetic food product and hence it is necessary that the variance between individual fibers, when treated in an identical manner, be slight. Otherwise, it would be impossible to achieve a particular type of product which would possess the desired characteristics throughout. By this uniform distribution throughout each of the individual fibers of protein material, it is possible to uniformly effect a wide variety of changes in the physical properties of the fibers and hence of the resulting food product. As previously indicated, changes in the strength, color, flavor, and the like may be achieved by this method.

The amount of additive or modifying agent which may be incorporated will vary within fairly wide limits, depending both on the additive itself and on the protein material in which it is to be incorporated. The amount of modifying agent which is to be added will also vary according to the properties which it is desired to impart to the finished fiber. For example, a fiber, such as that illustrated in Fig. 5, containing a relatively large proportion of additive (32 per cent) shows considerable reduction in strength from the untreated fiber illustrated in Fig. 1. It is obvious that variations in the amounts of additive will thus permit uniform control of the strength or toughness of the fibers and will enable the production of a fiber resembling very closely the strength of the fiber found in the natural product which is to be simulated. Additionally in the case of certain aromatic materials, as for example clove oil, a minute trace of such an additive will be sufficient to impart a strong odor and flavor to the fiber within which it has been incorporated. It is therefore considered within the scope of the present invention to add amounts of modifying agents varying from a barely distinguishable trace up to and including the maximum amount capable of inclusion within a particular protein fiber.

The terms "additives" and "modifying agents" are used interchangeable throughout the specification and appended claims and are intended to cover all edible miscible or nonmiscible substances, such as cod-liver oil, salad oil, spice oils, skim milk solids, shortenings, cottonseed oil, butter, mono-sodium glutamate, sugar, protein hydrolysates, dyes, pigments, spices, gums, binders, salts, flavoring agents, and the like, as well as mixtures thereof, which can be satisfactorily dispersed in protein solution in particle sizes not exceeding the size of the orifice through which the protein is to be extruded and which do not materially affect the solubility or homogeneity of the protein in solution.

Obviously, many modifications and variations of the invention as hereinbefore set forth may be made without departing from the spirit and scope thereof, and therefore only such limitations should be imposed as are indicated in the appended claims.

I claim:

1. A process for the manufacture of edible protein fibers for use in food products which comprises: forming a dispersion of a protein in a dispersing medium; adding to said dispersion a small amount of a modifying agent; and thereafter forcing the dispersion containing said modifying agent through an orifice into a coagulation bath to produce a quantity of fine protein filaments each containing said modifying agent substantially uniformly distributed throughout.

2. A process for the manufacture of edible protein fibers for use in food products which comprises: dispersing a protein in a dispersing medium; incorporating in the dispersion thus obtained a small amount of an additive; uniformly mixing said additive into said dispersion; and thereafter forming said dispersion into a plurality of filaments each containing a substantially uniformly distributed amount of said additive.

3. In the process for the preparation of edible protein fibers for incorporation into food products wherein a protein dispersion is forced through a spinneret into a coagulating medium to produce a quantity of fine filaments, the step which comprises: incorporating into each of said filaments during the formation thereof a small quantity of a modifying agent.

4. The process as in claim 3 wherein the modifying agent is miscible with the protein dispersion.

5. The process as in claim 3 wherein the modifying agent is immiscible with the protein dispersion.

6. Protein material for incorporation into a food product comprising: edible man-made protein fibers having substantially uniformly distributed throughout a small quantity of a modifying agent.

7. The protein material of claim 6 wherein the modifying agent is shortening.

8. The protein material of claim 6 wherein the protein fibers are soybean fibers.

9. A process for the manufacture of edible protein fibers for use in food products which comprises: dispersing casein in a dispersing medium; incorporating in the dispersion thus obtained a small amount of an additive; uniformly mixing said additive into said dispersion; and thereafter forming said dispersion into a plurality of filaments each containing a substantially uniformly distributed amount of said additive.

10. The process of claim 9 wherein the additive is a miscible dye.

References Cited in the file of this patent

UNITED STATES PATENTS

| | | |
|---|---|---|
| 1,001,150 | Kellogg | Aug. 22, 1911 |
| 2,162,047 | Allen | June 13, 1939 |
| 2,211,961 | Meigs | Aug. 20, 1940 |
| 2,376,485 | Hermann et al. | May 22, 1945 |
| 2,398,636 | Henney et al. | Apr. 16, 1946 |
| 2,560,621 | Wrenshall | July 17, 1951 |

OTHER REFERENCES

"The Meat Flavour" by Max Salomon, Food Manufacture, March 1943, pages 91 and 92.